United States Patent [19]

Ballinger

[11] 3,881,192

[45] Apr. 29, 1975

[54] MAGNETIC RECORDER AND PRINTED CIRCUIT RECORDING HEAD THEREFOR

[75] Inventor: Dale O. Ballinger, Denver, Colo.

[73] Assignee: Honeywell Inc., Minneapolis, Minn.

[22] Filed: May 24, 1973

[21] Appl. No.: 363,608

[52] U.S. Cl. .......................... 360/123; 340/174 QB

[51] Int. Cl. .......................... G11b 5/20; G11b 5/44

[58] Field of Search ......... 346/74 MC; 340/174.1 F, 340/174 QB; 179/100.2 C; 360/123

[56] References Cited

UNITED STATES PATENTS

| | | | |
|---|---|---|---|
| 3,522,441 | 8/1970 | Yu Hata | 340/174 QB |
| 3,549,825 | 12/1970 | Trimble | 179/100.2 C |
| 3,633,189 | 1/1972 | Billawala | 340/174.1 F |
| 3,634,632 | 1/1972 | Watson | 179/100.2 C |
| 3,691,541 | 9/1972 | Bruder | 340/174 QB |

*Primary Examiner*—Bernard Konick
*Assistant Examiner*—Jay P. Lucas
*Attorney, Agent, or Firm*—Arthur H. Swanson; Lockwood D. Burton; Mitchell J. Halista

[57] ABSTRACT

A recorder includes a magnetic recording head with a plurality of projecting recording pins mounted in respective openings of a printed circuit board with printed circuit conductors on the board providing single-turn current carrying circuitry around each of the recording pins. A common reset and bias winding is wrapped around the projecting pins and is connected to a pair of edge connectors of the printed circuit board. The printed circuit conductors are connected in a coincident current matrix configuration with a recording pin at each matrix intersection to provide selection of the recording pins. A recorder uses the printing circuit board mounted adjacent to a recording medium responsive to the magnetic fields produced by selected ones of the recording pins.

8 Claims, 5 Drawing Figures

MAGNETIC RECORDER AND PRINTED CIRCUIT RECORDING HEAD THEREFOR

CROSS REFERENCE TO RELATED PATENT

Subject matter shown but not claimed herein is shown and claimed in U.S. Pat. No. 3,774,226 of Dale O. Ballinger and Norman L. Stauffer which issued on Nov. 20, 1973, and is assigned to the same assignee as the present application.

BACKGROUND OF THE INVENTION

1. Field of the Invention

The present invention relates to recorders. More specifically, the present invention is directed to a recorder recording head for recording on a magnetically responsive medium.

2. Description of the Prior Art

Recent developments in the field of magnetic recording such as a new magnetic recording medium as shown in U.S. Pat. No. 3,683,382, have provided the capability for producing a magnetic recording which is optically visible. In order to produce such a magnetic recording, various types of recording systems have been adapted to the aforesaid type of recording medium, e.g., recording systems such as those found in U.S. Pat. Nos. 3,622,398; 3,622,397 and 3,633,720. However, these prior art recording systems have inherent drawbacks including those relating to the size and complexity of the recording head. In order to overcome these disadvantages, it is desirable to provide a magnetic recording head having a minimum size and weight while being compatible with mechanical assembly techniques such as those used in the manufacture of printed circuits.

SUMMARY OF THE INVENTION

An object of the present invention is to provide a magnetic recording head utilizing printed circuit manufacturing techniques.

Another object of the present inventiion is to provide a magnetic recording head for recording a plurality of discrete marks on a magnetic recording medium.

A further object of the present invention is to provide a magnetic recording head capable of being energized by a coincident current matrix.

In accomplishing these and other objects, there has been provided, in accordance with the present invention, a magnetic recording head having a plurality of magnetically responsive pins individually located on a printed circuit board and projecting outwardly from the printed circuit board to form recording pins. Printed wiring on the printed circuit board is arranged to provide single turn current carrying wiring with respect to each of the pins while a common bias and reset wiring is arranged on the printed circuit board in an operative relationship with all of the recording pins on the printed circuit board.

BRIEF DESCRIPTION OF THE DRAWINGS

A better understanding of the present invention may be had with the following detailed description when read in connection with the accompanying drawings, in which.

DESCRIPTION OF THE PREFERRED EMBODIMENT

Detailed Description

Figure 1:
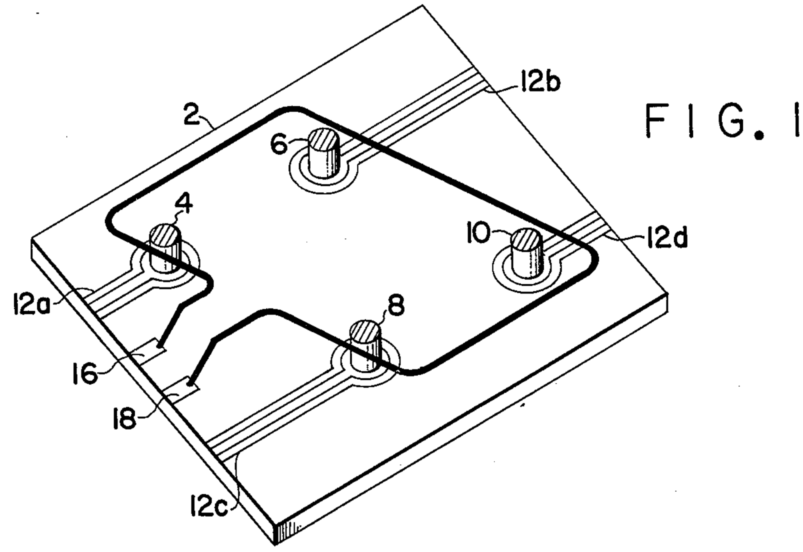
FIG. 1 is a representation of a top view of a magnetic recording head embodying the present invention.

Referring to FIG. 1 in more detail, there is shown a top view of a magnetic recording head using a printed circuit board 2 as a support member for a plurality of recording pins 4, 6, 8 and 10, passing through the board 2. It should be noted that the terms "top", "bottom" and "side", refer to the illustrated view and may not necessarily represent suitable terms for a recording head in actual use. Printed wiring on the printed circuit board 2 is arranged to provide a separate single turn current carrying configuration, i.e., on ampere-turn relationship, around each of the pins 4 to 10. Specifically, referring to the recording pin 4, there is shown a printed wiring conductor **12*a* extending from an edge of the printed circuit board 2 along a path which virtually encircles the recording pin 4, i.e., the printed conductor 12*a* encompasses less that 360° around the pin 4 to prevent an electrical short circuit overlap, before returning to the edge of the printed circuit board adjacent to and spaced from the location of the aforesaid begining of the printed conductor 12 *a*. Similar printed circuit board conductors 12*b*, 12*c* and 12*d*, are arranged in operative relationship with recording pins 6, 8 and 10, respectively. Of course, additional wiring may be provided on the printed circuit board to interconnect the printed conductors 12*a* to 12*d* to form the energizing matrix as shown in FIG. 3 and described hereinafter rather than simply bringing the ends of the printed conductors 12*a* to 12*d* out to the edge of the board 2** for contact with conventional edge receiving printed circuit board connectors (not shown).

A bias and reset winding 14 which may be a separate winding of electrically insulated wire is mounted on the surface of a printed surface board by any suitable means and is arranged to and encompass all of recording pins 4 to 10. The winding 14 has the ends connected to respective ones of a pair of printed conductors 16 and 18 on an edge of the printed circuit board 2 which may the same edge on which some or all of the printed conductors **12*a* to 12*d* are terminated. It should be noted that the recording pins 6 to 10 along respective parallel lines but displaced with respect to pins 6 and 10 to form a staggered arrangement which is discussed in more detail hereinafter. The recording pins 4 to 10 project from the top surface of the printed circuit board 2 for a distance sufficient to allow the bias and reset windings 14** to form an operative relationship therewith.

Figure 2:
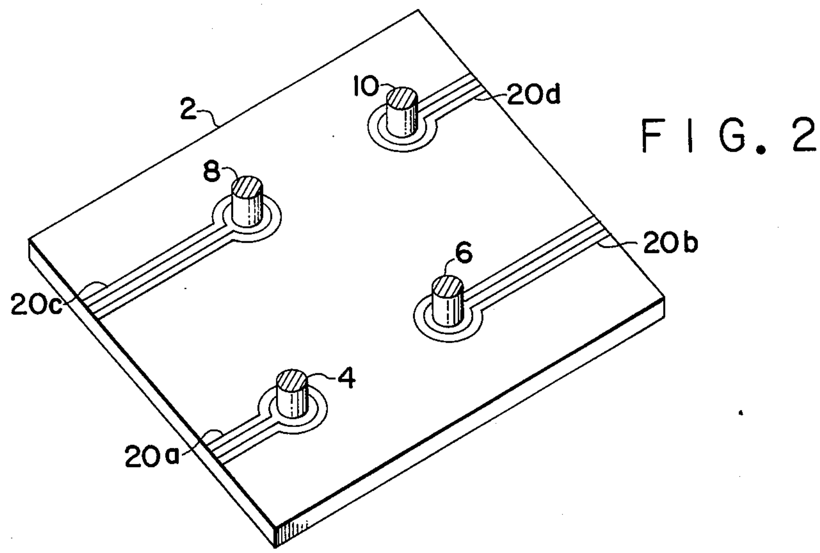
FIG. 2 is a bottom view of the recording head shown in FIG. 1.

In FIG. 2, there is shown a bottom view of the magnetic recording head shown in FIG. 1, and the same reference numbers have been used for the printed circuit board 2 and the recording pins 4 to 10. A second set of printed circuit conductors **20*a*, 20*b*, 20*c* and 20*d* are arranged on this side of the printed circuit board 2 in association with the pins 4 to 10, respectively, and in the same configuration used for the printed conductors 12***a* to 12*d* on the aforesaid top side of the printed circuit board 2. The printed conductors 20*a* to 20*d* are, also, terminated at the edges of the printed circuit 42 for ultimate connection to conventional printed circuit board edge connectors (not shown) and, as indicated for the printed conductors on this side of the printed, circuit board 2 to interconnect the printed conductors 20*a* to 20*d* in the energizing matrix circuit shown in FIG. 3. Further, this side of the printed circuit board 2 does not have a bias and reset winding mounted thereon such as the bias and reset winding 14 shown in FIG. 1. The recording pins 4 to 10 project from the printed circuit board 2 on the bottom side of the board 2 to form recording ends which are ultimately positioned adjacent to a magnetically responsive recording medium. The pins 4 to 10 typically extend from the surface of the printed circuit board 2 for a distance less than 0.030 of an inch. The bias and reset winding 14 may, in an exemplary configuration, be constructed of ten turns of 0.003 inch diameter magnet wire built into a rectangular coil.

Figure 3:
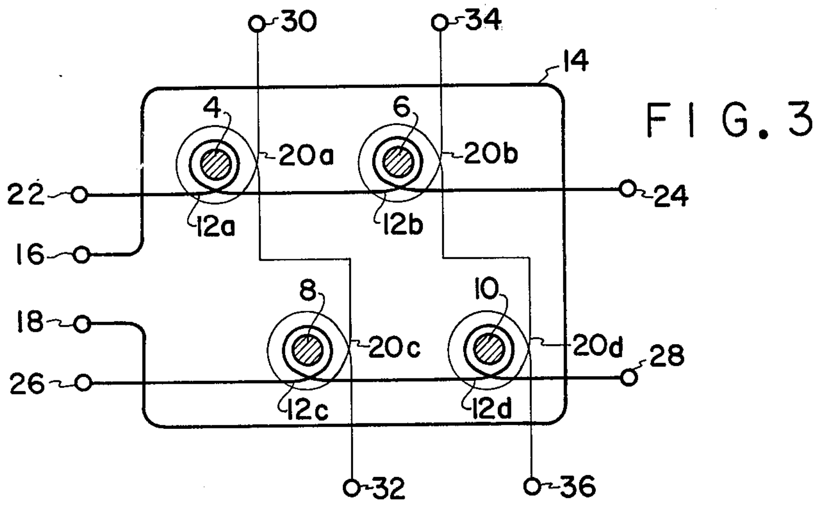
FIG. 3 is a schematic illustration of the energizing circuitry for the recording head shown in FIGS. 1 and 2.

In FIG. 3, there is shown a coincident current pin selection matrix formed by the printed conductors 12*a* to 12*d* and 20*a* to 20*d*, i.e., printed conductors similar to those shown in FIGS. 1 and 2, to enable the recording pins 4 to 10 to be selected by a coincident current energizing technique. Thus, the printed conductors 12*a* and 12*b* are serially connected with the end of the series circuit being terminated at respective input terminals 22 and 24. Similarly, printed conductors 12*c* and 12*d* are serially connected and terminated in input signal terminals 26 and 28. These two series circuits may be described as forming the X axis, or rows, of the coincident current matrix. The Y axis, or columns, of the matrix are formed by similar series connections of the printed conductors 20*a* to 20*d*. Specifically, conductors 20*a* and 20*c* are serially connected and terminated in input signal terminals 30 and 32, while conductors 20*b* and 20*d* are serially interconnected and terminate in input signal terminal 34 and 36. The bias and reset winding 14 is, of course, shown pictorially in FIG. 3 as encompassing all of the recording pins 4 to 10 in the manner shown in FIG. 1.

Mode of Operation

Figure 4:
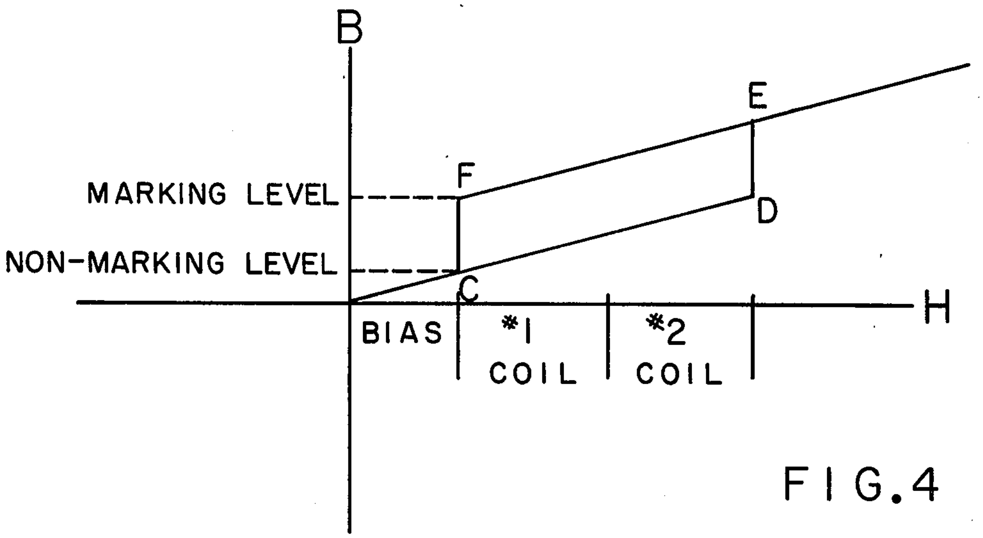
FIG. 4 is a waveshape diagram showing an operational characteristic for the material used in the recording pins in the magnetic recording head shown in FIGS. 1 and 2.

Each of the recording pins 4 to 10 is selected by a coincident current signal applied to an intersection of the selection matrix shown in FIG. 3. Thus, by applying a row signal to the signal terminals 22 and 24 while concurrently applying a column signal to the column terminals 30 and 32, the recording pin 4 located at the intersection of these signal paths is selected for recording on a magnetically responsive recording medium. The recording pins are initially biased by a bias current supplied to the bias winding terminals 16 and 18. A waveshape of the operation of a typical recording pin is shown in FIG. 4. From this waveshape diagram, it may be seen that the effect of the bias current through the bias winding 14 is to set the magnetic state of the recording pin at a point labeled C along a characteristic B-H curve for the particular material used for the recording pin. The preferred material is a ferromagnetic material which has an inherent rapid switching characteristic of the magnetization level when subjected to a magnetic field. An example of a material exhibiting this capability is a material manufactured by the ComGeneral Corporation of Dayton, Ohio wherein the aforesaid operation is referred to as the Wiegand Effect. The magnetization level of the recording pin produced by the bias winding is arranged to be a non-marking level for the aforesaid magnetic recording material shown in U.S. Pat. No. 3,683,382.

The effect of supplying a current in the row and column winding circuits is to move the magnetization level along the B-H curve shown in FIG. 4 to a higher level until a transition point D is reached from which level the recording pin material will rapidly switch to an even higher magnetization level on the B-H curve, at which level a marking effect is produced on the magnetic recording material. When the row and column signals are removed from the selection matrix, the magnetization level decreases along the upper B-H curve shown in FIG. 4, from point E to point F which terminal point is still above the magnetization level needed for marking the aforesaid magnetic recording material. In order to return the selected recording pin to an "off" state, which is represented on the B-H curve of FIG. 4 at point C as a non-marking level, a reset current is applied to the reset winding 14 to produce a magnetic field which opposes the effect of the selection magnetic field to drive the selected pin to the off state. The amplitude of the reset current is determined by the ampere-turns necessary to produce a suitable drive to the off state of the recording pin. for example, using the 10 turn reset winding discussed above, a 3 to 5 ampere reset signal having a 5 microsecond duration would be applied to the reset winding 14 in a direction to produce the aforesaid decrease in the magnetization level and, consequently, the switching of the selected recording pin from point F to point C on the B-H curve of FIG. 4. This on-off sequence can be repeated at a high frequency, e.g., at a 25KHZ rate, if desired, to produce a particular marking effect on the aforesaid magnetic recording material. The transition time for the aforesaid material between its marking and non-marking levels on the B-H curve of FIG. 4 is approximately 50 microseconds which characteristics enable a selected recording pin to be rapidly switched on and off.

Figure 5:
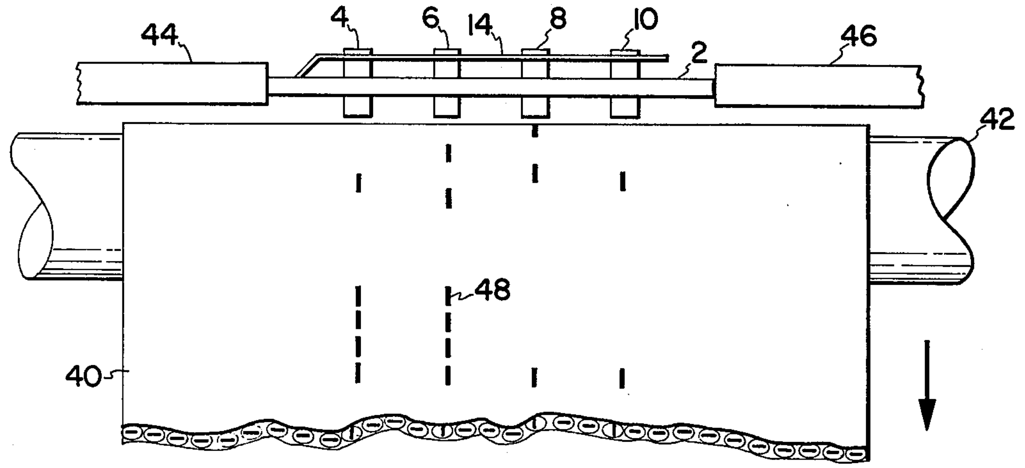
FIG. 5 is a pictorial illustration of the magnetic recording head shown in FIGS. 1 and 2 arranged for recording on a magnetically responsive recording medium.

In FIG. 5 there is shown a magnetic recorder suitable for using the magnetic recording head shown in FIGS. 1 and 2. The same reference numbers used in FIGS. 1 and 2 have been used in FIG. 5 to refer to the components of the magnetic recording head. A magnetic recording medium 40 such as that disclosed in the aforesaid U.S. Pat. No. 3,683,382 is shown supported across a support roller 42 with a recording surface adjacent to the recording pins 4 to 10 of the recording head. A pair of side support members 44 and 46 are used to support the recording head above the recording medium 40 with the projecting ends of the recording pins 4 to 8 adjacent to the recording medium 40 and to provide electrical contact to the edge connections of the printed conductors on the printed board 2. The recording produced by the magnetic recording head is shown in exemplary form in FIG. 5 as a series of dashes 48 selectively arranged on the surface of the magnetic recording medium with each dash being in the form of a contrasting area with respect to the unrecorded surface of the recording medium 40. The recording medium 40 is transported across the roller 42 under the recording head in the direction of the illustrated arrow by any suitable transport means (not shown).

Accordingly, it may be seen that there has been provided, in accordance with the present invention, a magnetic recording head for recording discrete marks on a magnetic recording medium and having a structure capable of being manufactured by the utilization of printed circuit manufacturing techniques.

The embodiments of the invention in which an exclusive property or privilege is claimed are defined as follows:

1. A magnetic recording head comprising;

an electrically insulating substrate having a predetermined pattern of apertures therein, a plurality of recording pins located in said apertures and projecting above an adjacent surface of said substrate, said recording pins each exhibiting an operating characteristic characterized by a rapid transition between magnetization levels at predetermined transition points along a B-H curve representing an operation of said recording pins following a change in a magnetic field applied to a selected one of said recording pins, and current carrying means supported on said substrate and providing separate current carrying paths having an ampere-turn relationship with each of said recording pins, said current carrying paths being located on both sides of said substrate and including first circuit means interconnecting said current carrying paths on one side of said substrate to form rows of electrically interconnected recording pins and second circuit means located on the other side of said substrate and interconnecting current carrying paths on the same side of said substrate to form electrically interconnected columns of said recording pins whereby each of said recording pins is arranged at a corresponding intersection of an X-Y matrix.

2. A recording head as set forth in claim 1 wherein said insulating substrate is a sheet of electrically insulating material having a thickness less than the length of said recording pins.

3. A recording head as set forth in claim 2 wherein said recording pins project above adjacent surfaces of said substrate on both sides of said substrate and said bias winding encompasses all of said recording pins on one side of said substrate.

4. A recording head as set forth in claim 1 wherein said first and second means are printed circuit conductors arranged on respective surfaces of said substrate.

5. A recording head as set forth in claim 4 wherein said current carrying paths are printed circuit conductors printed on respective surfaces of said printed circuit board.

6. A recording head as set forth in claim 5 wherein said recording pins are arranged along parallel lines on said substrate and have a staggered relationship with respect to recording pins on adjacent parallel lines.

7. A recording head as set forth in claim 5 and including a bias winding encompassing all of said recording pins.

8. A recording head as set forth in claim 7 wherein said printed circuit conductors and said bias winding terminate in corresponding electrical connections on an edge of said insulating substrate.

* * * * *